Oct. 10, 1944.   T. A. WELGER   2,359,952
HOSE AND COUPLING
Filed May 14, 1943

WITNESS:

INVENTOR
Theodore A. Welger
BY
Augustus B. Stoughton
ATTORNEY.

Patented Oct. 10, 1944

2,359,952

UNITED STATES PATENT OFFICE 2,359,952

HOSE AND COUPLING

Theodore A. Welger, Trenton, N. J., assignor to The Whitehead Bros. Rubber Company, Trenton, N. J., a corporation of New Jersey Application May 14, 1943, Serial No. 486,931

2 Claims. (Cl. 285—138)

A hose coupling including sections of duck and rubber hose having external conic frustrum shaped ends disposed in confronting relation with a hose ply of rubber or rubber material clamped between them, and also including a pair of half-ring coupling elements of corresponding internal shape embracing said ends and bolted together with space between for the accommodation of the hose ply, is old. An example of the type of hose coupling to which reference has been made is described in Letters Patent No. 1,883,086 of October 18, 1932, to Swartz.

Such hose has gone into wide use and has proven to be very satisfactory under comparatively low operating pressure but, under comparatively high operating pressure, for example and by way of description and not limitation of the order of 200 pounds per square inch, leaks develop at the peripheries of the hose plies which are clamped between the coupling rings, thereby unfitting the couplings for use at high pressure.

I have discovered that leaks are caused by slippage or creeping of the hose ply in respect to the conical inner surface of the coupling rings, by dishing or bending of the rings, or by both, and I have provided means for correcting such causes and for avoiding leakage under high operating or radial pressures.

One object of the present invention is to fit hose of the type to which reference has been made for use under high operating pressures and to thereby enlarge its field of successful use and fulfill a demand for hose that will withstand the high pressures required in modern practice.

Other objects of the invention will appear from the following description at the end of which the invention will be claimed.

Generally stated, the invention comprises, a rib and its complemental groove arranged between the conical surfaces of the hose ends and of the respective coupling elements; it also comprises, bolt lugs located at the ends of the half-ring coupling elements and projecting at right angles to the plane of the rings, and it also comprises the combination of both these structures.

The invention further comprises the improvements to be presently described and finally claimed.

In the following description, reference will be made to the accompanying drawing forming part hereof and in which:

Fig. 1 being taken on the line 1—1 of Fig. 2;

Figure 2:
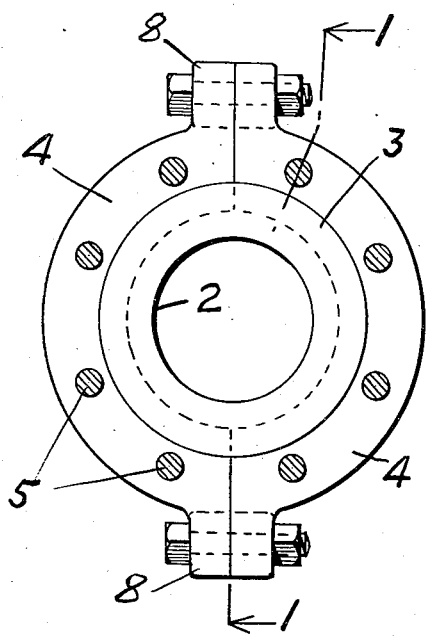
Fig. 2 is a sectional view taken on the line 2—2 of Fig. 1.
Figure 1:
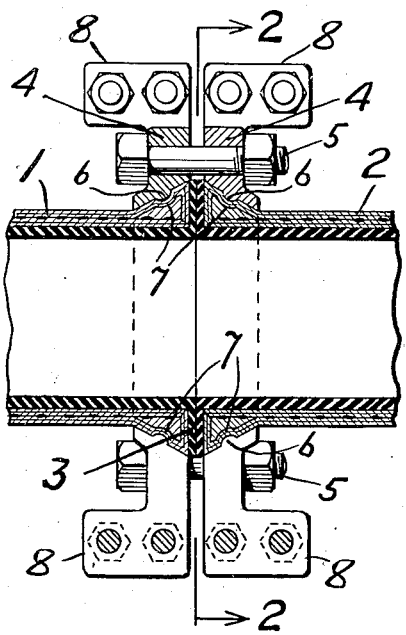
Fig. 1 is a longitudinal section of a hose and coupling illustrating features of the present invention.
Figure 4:
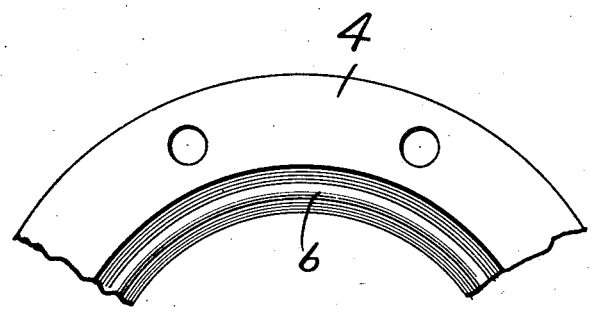
Fig. 4 is a face view of Fig. 3.
Figure 3:
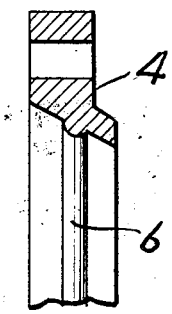
Fig. 3 is a detached view illustrating in section a portion of one of the coupling elements.

In the drawing, 1 and 2 indicate sections of duck and rubber hose having external conic frustrum shaped ends disposed in confronting relation with a hose ply or plies 3 of rubber or rubber material clamped between them. 4 indicates a pair of half-ring coupling elements of internal shape corresponding to the external shape of the hose ends. These rings embrace the hose ends and are bolted together as at 5, and there is space between them for the accommodation of the hose ply 3. There is nothing new about the structure which has just been described.

A rib 6 and its complemental groove 7 are arranged between the conical surfaces of the hose ends and the respective coupling elements. The rib and groove oppose relative sliding or creeping movement at the conical surfaces of the hose element. If such movement occurred, the result would be that the clamping pressure at the outer rim portion of the hose ply would be released but the rib and groove oppose such movement and thereby enable the coupling to withstand high operating pressure.

It may be remarked that, if the outer plies of the hose should creep toward the space between the coupling elements, it would bulge and in so doing release pressure at the rim portions of the ply or plies 3, thus permitting leakage.

8 indicates bolt lugs located at the ends of the half-ring coupling elements and projecting at right angles to the plane of the rings. The function of the lugs is to oppose dishing outwardly at their conical portions. If the rings dish, the supporting and clamping pressure at the outer rim portions of the plies would be released, permitting the occurrence of leakage.

In the foregoing description and in the appended claims reference is made to a rib and its complemental groove, that term is used to include more than one such rib and groove, the number being to a certain extent dictated by the range of pressures employed, and it is not intended to imply that shape or size of the rib or ribs and groove or grooves shall be that shown in the drawing, because the size and shape should be in keeping with good manufacturing practices.

It will be obvious to those skilled in the art to which the invention relates that modifications may be made in details of construction and arrangement and in matters of mere form without departing from the spirit of the invention.

I claim:

1. In a hose coupling including sections of duck and rubber hose having external conic frustrum shaped ends disposed in confronting relation with a hose ply of rubber or rubber material clamped between them, and a pair of half-ring coupling elements of corresponding internal conic frustrum shape embracing said ends and bolted together with space between for the accommodation of said hose ply, the improvement for opposing leakage under high operating pressure which comprises, bolt lugs located at the ends of the half-ring coupling elements and projecting at right angles to the plane of the rings and beyond the same, and bolts arranged through the projecting portions of said bolt lugs and opposing dishing of the conical portions of the ring and consequent release of clamping pressure at the outer rim portions of the plies.

2. In a hose coupling including sections of duck and rubber hose having external conic frustrum shaped ends disposed in confronting relation with a hose ply of rubber or rubber material clamped between them, and a pair of half-ring coupling elements of corresponding internal shape embracing said ends and bolted together with space between for the accommodation of said hose ply, the improvement for opposing leakage under high operating pressures which comprises, an annular rib and its complemental annular groove arranged between the conical surfaces of the hose ends and of the respective coupling elements, and in combination therewith bolts and their complemental lugs located at the ends of the half-ring coupling elements and projecting at right angles to the plane of the rings, said lugs and said rib and groove co-operating to oppose release of clamping pressure at the outer rim portions of the hose ply.

THEODORE A. WELGER.